(12) United States Patent
Zhan

(10) Patent No.: US 11,711,155 B2
(45) Date of Patent: Jul. 25, 2023

(54) SELF-ADAPTIVE MIMO DETECTION METHOD AND SYSTEM

(71) Applicant: ESPRESSIF SYSTEMS (SHANGHAI) CO., LTD., Shanghai (CN)

(72) Inventor: Rui Zhan, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 111 days.

(21) Appl. No.: 17/612,812

(22) PCT Filed: Feb. 26, 2020

(86) PCT No.: PCT/CN2020/076764
§ 371 (c)(1),
(2) Date: Nov. 19, 2021

(87) PCT Pub. No.: WO2020/233182
PCT Pub. Date: Nov. 26, 2020

(65) Prior Publication Data
US 2022/0255646 A1    Aug. 11, 2022

(30) Foreign Application Priority Data

May 20, 2019  (CN) .......................... 201910416274.1

(51) Int. Cl.
*H04B 17/30*      (2015.01)
*H04B 17/336*     (2015.01)
(Continued)

(52) U.S. Cl.
CPC ......... *H04B 17/336* (2015.01); *H04B 7/0417* (2013.01); *H04B 7/0456* (2013.01); *H04L 27/3405* (2013.01)

(58) Field of Classification Search
CPC .. H04B 17/336; H04B 7/0417; H04B 7/0456; H04L 27/3405
See application file for complete search history.

(56) References Cited

U.S. PATENT DOCUMENTS 8,687,750 B1    4/2014  Lee et al.

FOREIGN PATENT DOCUMENTS

CN      101540661 A      9/2009
CN      103746728 A      4/2014
(Continued)

OTHER PUBLICATIONS

Wubben et al., "MMSE Extension of V-BLAST based on Sorted QR Decomposition", Department of Communications Engineering, University of Bremen, Germany.
(Continued)

*Primary Examiner* — Curtis B Odom
(74) *Attorney, Agent, or Firm* — Aird & McBurney LP

(57) ABSTRACT

The present disclosure discloses an adaptive MIMO detection method and system. The method includes the following steps: a) determining whether a Signal to Noise Ratio of a data packet is greater than a set threshold for Signal to Noise Ratio, and if yes, performing ZF preprocessing on the channel matrix, and if not, performing MMSE preprocessing on the channel matrix; b) performing sorted QR decomposition on the channel matrix processed in step a) to obtain a plurality of decomposition matrices; c) determining whether a condition number of the channel matrix of the data packet is greater than a set threshold for condition number of the channel, and if yes, Lattice Reduction is performed on the decomposition matrices obtained in step b); d) determining whether an estimated value of an interference term of the channel matrix is greater than a threshold for the estimated value of the interference term of the channel matrix, and if (Continued)

yes, SIC detection mode is selected for MIMO detection on the data packets, and if not, K-best detection mode is selected for MIMO detection on the data packets; and e) according to processing results from steps a) to d), performing MIMO detection on the data packet.

20 Claims, 6 Drawing Sheets

(51) Int. Cl.
  *H04B 7/0417* (2017.01)
  *H04B 7/0456* (2017.01)
  *H04L 27/34* (2006.01)

(56) References Cited

FOREIGN PATENT DOCUMENTS

| CN | 104038269 A | 9/2014 |
|---|---|---|
| CN | 104580039 A | 4/2015 |
| CN | 104734818 A | 6/2015 |
| CN | 109936400 A | 6/2019 |
| JP | 2008131366 A | 6/2008 |
| WO | 2020233182 A1 | 11/2020 |

OTHER PUBLICATIONS

Aubert et al., "Lattice Reduction-Aided Minimum Mean Square", American University of Beirut, ECE Department, Bliss Street, Beirut, Lebanon.

"MIMO 系统中的信号检测算法研究 —Research on Signal Detection Algorithm in MIMO Systems", as cited in First Office Action for CN201910416274.1.

"Research on MIMO Receiving Terminal Detection Technology in Wireless Communication System", as cited in First Office Action for CN201910416274.1.

First Office Action with Search Report for CN201910416274.1, dated Jul. 1, 2019.

International Search Report for PCT Publication WO2020233182A1, dated Nov. 26, 2020.

SELF-ADAPTIVE MIMO DETECTION METHOD AND SYSTEM

TECHNICAL FIELD

The disclosure relates to low-complexity detection of a multi-antenna wireless communication system, in particular, to an adaptive MIMO detection method and system.

BACKGROUND ART

With the rapid development of wireless communication technology, more and more wireless communication systems have begun to adopt multi-antenna communication technology (i.e., Multiple Input Multiple Output, MIMO), which expands the spectrum utilization and data rate (by spatial multiplexing) in the system while achieving higher diversity gains to improve the reliability of system data transmission.

In particular, with the evolution of wireless communication theory, the number of antennas adopted by the new MIMO wireless communication technology is becoming or is about to become larger and larger. At the same time, user equipment is getting smaller in size, and the degree of integration is getting increasingly higher. This makes the research of flexible and efficient detection methods for MIMO signals very meaningful.

On one hand, the complexity of the detection method needs to be controllable to ensure a large throughput rate of system data; on one hand, the detection system is required to have a wide range of applications, flexibility and ease of use; on the other hand, it needs to meet the requirements of Very Large Scale Integrated Circuits (VLSI) designed to achieve low power consumption and low area.

The MIMO detection method and system in the present disclosure particularly relate to spatial multiplexing MIMO detection. Only when the MIMO channel condition is good enough, spatial multiplexing of data may be realized.

The channel conditions herein mainly include the correlation of the MIMO channel matrix $\bar{H}$ and the Signal to Noise Ratio (SNR) of the receiver.

According to the level of detection performance, spatial multiplexing MIMO detection methods may be classified into optimal detection, sub-optimal detection, and near-optimal detection.

Commonly used MIMO optimal detection methods, such as Maximum Likelihood (ML) detection, may obtain the best bit error detection performance, but its detection complexity increases exponentially with the size of the QAM constellation and the number of spatial multiplexing data streams. Therefore, under most system configurations, the optimal detection is not practical, and it is only used as a reference for the performance comparison of other MIMO detectors in the simulation.

MIMO sub-optimal detection methods may further be classified into two types, namely, linear and nonlinear. Linear sub-optimal detection methods, such as Zero Forcing (ZF), Minimum Mean Square Error (MMSE), may use linear equalization to process all parallel data streams at one time, with the lowest complexity and small system overhead, but its Receiver Diversity Gain (RDG) is close to the single antenna system (i.e., Single Input Single Output, SISO), so the bit error performance thereof is the worst. Nonlinear sub-optimal detection methods, such as various forms of Successive Interference Cancellation (SIC), slightly increase the Receiver Diversity Gain, but are susceptible to error propagation. In the case of MIMO channels with little mutual interference between each other, its performance may be close to ML detection, but for most channel conditions, its gap with ML in performance is large.

MIMO near-optimal detection methods usually refer to various tree search algorithm variants based on Sphere Decoder (SD). This type of algorithms may provide detection performance close to the ML method, but their complexity is much lower than that of ML. Among them, the breadth-first K-best detector may ensure a throughput rate independent of Signal to Noise Ratio (SNR) of the signal received and the performance being close to ML detection. Therefore, K-best is one of the most commonly used MIMO detection methods. Its trade-off between detection performance and complexity is achieved by adjusting the K factor in K-best.

Under different system settings and channel conditions, the most reasonable detection methods for MIMO are different. In other words, under a certain system setup and channel conditions, which detection method shall be adopted is a compromised solution that comprehensively considers various factors such as the number of the antennas configured, the size of the M-QAM constellation, the computing power of the system, and the link throughput requirements.

In order to accommodate to various application scenarios, the currently various wireless communication protocols need to support a large and varied range of the M-QAM constellation size and antenna number. For example, the 802.11ac Wi-Fi protocol supports constellation mapping from BPSK to 256QAM, and the antenna configuration also supports from 1×1 to 8×8.

At the same time, in actual wireless communication systems, MIMO technology is not used alone, but usually combined with other wireless communication technologies, such as Orthogonal Frequency Division Multiplexing (OFDM), to further improve system performance and spectrum utilization, and counteract the non-ideal conditions of the wireless channel.

For example, the wireless local area network 802.11n/ac/ax defined by IEEE in recent years, the $4^{th}$-generation wireless communication system LTE defined by 3GPP, and the upcoming $5^{th}$-generation wireless communication system of 3GPP are typical examples of MIMO technology combined with OFDM technology.

Assuming that in the MIMO-OFDM system, the number of OFDM data subcarriers is $N_{sd}$, there may be $N_{tx} \times N_{rx}$ dimensional channel matrix $\bar{H}_{sd}(1) \ldots \bar{H}_{sd}(N_{sd})$ of $N_{sd}$ data subcarriers in total.

In addition, due to the multipath effect of the wireless channel, the channel conditions on each subcarrier are different. Therefore, the MIMO channel on each subcarrier of the MIMO-OFDM system may be regarded as mutually independent flat Rayleigh fading channels, that is, MIMO detection on each subcarrier may be regarded as mutually independent MIMO detection.

Therefore, the most reasonable MIMO detection methods on different subcarriers may be not the same.

The inventor(s) noticed that although in the prior art it has tried to propose different adaptive MIMO detection methods and devices, these existing methods and devices have not fully considered and solved at least the following problems:

1) switching between algorithms with large differences is implemented, it is therefore necessary to set separate circuits or modules for different algorithms at the hardware implementation level, which disadvantageously increases the system volume and power consumption;

2) adaptively optimizing the channel matrix preprocessing is not considered; and 3) the decision thresholds used to select the decision condition of the detection algorithm are usually predetermined, whereas the adaptive adjustment of the decision thresholds are not taken into consideration.

For example, Chinese Patent No. CN101540661B discloses a switching-b based adaptive MIMO decoding method, in which the method switches between the ZF decoding detection method, the ZF-OSIC decoding detection method, and the sphere decoding detection method with large differences in implementation. The adaptive optimization of the channel matrix preprocessing is not considered, and the decision thresholds are determined by simulation without considering the adaptive adjustment of the decision thresholds.

For another example, Chinese Patent No. CN103746728B discloses a hybrid adaptive MIMO reception detection method, in which the method switches between the Zero Forcing detection algorithm, the minimum mean square error-interference cancellation algorithm, and the maximum likelihood algorithm with large differences in implementation, without considering the adaptive optimization of the channel matrix preprocessing, and derives the decision thresholds for each algorithm in advance through the training signal without considering the adaptive adjustment of the decision thresholds.

For another example, Chinese Patent Application with publication No. CN104734818A discloses an adaptive switching method and device for MIMO reception algorithms, where the method switches between linear detection algorithms and maximum likelihood algorithms with large differences in implementation, without considering the adaptive optimization of the channel matrix preprocessing, and the decision thresholds are obtained through simulation in advance without considering the adaptive adjustment of the decision thresholds.

In summary, there is a need for an adaptive MIMO detection method and system, which may adaptively switch between selected similar detection modes to optimize the reuse of circuit modules at the hardware implementation level, adaptively optimize the channel matrix preprocessing, and adaptively adjust the decision thresholds according to system conditions, so as to achieve flexible configuration and deep optimization of MIMO detection through multi-level adaptive approaches. It should be understood that the technical problems listed above are only examples rather than limitations to the present disclosure, and the present disclosure is not limited to technical solutions that simultaneously solve all the above technical problems. The technical solution of the present disclosure may be implemented to solve one or more of the above or other technical problems.

SUMMARY OF THE INVENTION

In view of the above problems, the purpose of the present disclosure is to provide a generic, MIMO adaptive detector architecture and method with the assistance of a plurality of parameters to adaptively reduce the system MIMO detection complexity and match the various configurations and optimal MIMO detection requirements for different channel conditions supported by the system.

To this end, in one aspect of the present disclosure, an adaptive MIMO detection method is provided, which includes steps of the following: a) determining whether a Signal to Noise Ratio of a data packet is greater than a set threshold for Signal to Noise Ratio, and if yes, ZF preprocessing is performed on a channel matrix, and if not, MMSE preprocessing is performed on the channel matrix; b) performing a sorted QR decomposition of the channel matrix processed in step a) to obtain a plurality of decomposition matrices; c) determining whether a condition number of the channel matrix of the data packet is greater than a set threshold for the condition number of a channel, and if yes, performing Lattice Reduction on the decomposition matrices obtained in step b); d) determining whether an estimated value of an interference term of the channel matrix of the data packet is greater than the set threshold for the estimated value of the interference term of the channel matrix, and if yes, selecting a SIC detection mode for MIMO detection on the data packet, and if not, selecting a K-best detection mode for MIMO detection on the data packet; and e) according to processing results from steps a) to d), performing MIMO detection on the data packet.

In another aspect of the present disclosure, an adaptive MIMO detection system is provided, wherein the system includes: a threshold determination module configured to determine a set threshold for Signal to Noise Ratio, a set threshold for the condition number of the channel, and a set threshold for an estimated value of an interference term of a channel matrix; a parameter determination module configured to determine a Signal to Noise Ratio of a data packet, a condition number of the channel matrix of the data packet, and the estimated value of the interference term of the channel matrix of the data packet; a first decision module configured to determine whether Signal to Noise Ratio of the data packet is greater than the set threshold for Signal to Noise Ratio, and if yes, selecting to perform ZF preprocessing on the channel matrix, and if not, selecting to perform MMSE preprocessing on the channel matrix; a ZF/MMSE channel matrix preprocessing module configured to perform ZF preprocessing or MMSE preprocessing on the channel matrix based on the output of the first decision module; a QR decomposition module configured to perform a sorted QR decomposition on channel matrix processed by the ZF/MMSE channel matrix preprocessing module to obtain a plurality of decomposition matrices; a second decision module configured to determine whether the condition number of the channel matrix of the data packet is greater than the set threshold for the condition number of the channel, and if the condition number of the channel matrix of the data packet is greater than the set threshold for condition number of the channel, selecting to perform Lattice Reduction on the decomposition matrices obtained by the QR decomposition module; an original constellation domain/Lattice Reduction domain processing module configured to perform Lattice Reduction or not to perform Lattice Reduction on the decomposition matrices obtained by the QR decomposition module based on an output of the second decision module; a third decision module configured to determine whether the estimated value of the interference term of the channel matrix of the data packet is greater than the set threshold for the estimated value of the interference term of the channel matrix, and if yes, selecting a SIC detection mode for MIMO detection of the data packet, and if not, selecting a K-best detection mode for MIMO detection of the data packet; and a MIMO detection module configured to perform MIMO detection on the data packet in the SIC detection mode or the K-best detection mode based on an output of the third decision module.

The adaptive MIMO detection method and system according to the present disclosure may realize the flexible configuration and deep optimization of MIMO detection through multi-level adaptive means. These adaptive means include, but are not limited to, for example, adaptive switching between selected similar detection modes to optimize the reuse of circuit modules at the hardware implementation level, adaptively optimize the channel matrix preprocessing, and adaptively adjust the decision thresholds according to system conditions. At the same time, the adaptive MIMO detection method and system of the present disclosure may be applied to a MIMO-OFDM system to perform multi-level adaptive MIMO detection on each subcarrier.

In addition, the technical solution of the present disclosure may adaptively adjust the preprocessing and MIMO detection strategies to achieve a balance between detection performance optimization and system complexity.

At the same time, the technical solution of the present disclosure is flexible and convenient in application, and is suitable for different M-QAM constellation sizes and MIMO antenna numbers, and may meet the requirements of different wireless communication system standards, and has a wide application range.

It should be understood that the foregoing description of the state of the art and brief summary of the disclosure is illustrative but not restrictive.

DESCRIPTION OF THE PREFERRED EMBODIMENTS

The present disclosure will be more completely described below with reference to the accompanying drawings which form a part of the present disclosure and give exemplary embodiments through illustrations. It should be understood that the embodiments shown in the accompanying drawings and described below are merely illustrative but not restrictive on the present disclosure.

Figure 1:
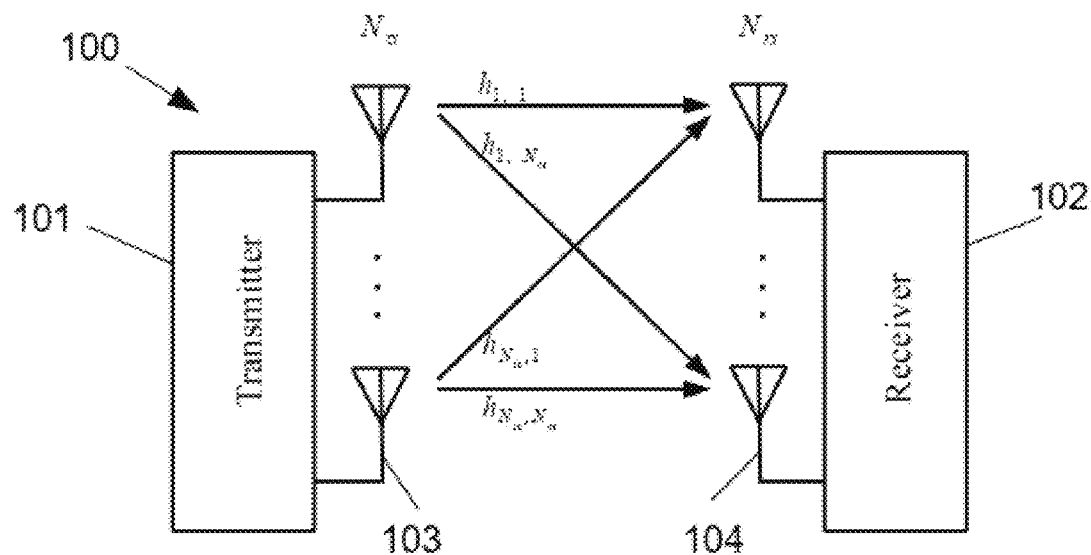
FIG. 1 is a schematic diagram of a generic channel transmission model of a multi-antenna system.

FIG. 1 is a diagram of a generic transmission model of a channel of a MIMO system. Assuming in a MIMO system 100, the number of transmitting antennas 103 at a transmitter 101 is $N_{tx}$, and the number of receiving antennas 104 at a receiver 102 is $N_{rx}$. The transmission equation of the MIMO channel is denoted as $\bar{r}=\bar{H}\cdot\bar{x}+\bar{n}$. The MIMO channel is a quasi-static flat Rayleigh fading channel, dimension of a channel matrix $\bar{H}$ is $N_{rx} \times N_{tx}$, and its elements $h_{i,j}$ are two-dimensional Gaussian random variables with a mean value of zero and a variance of one (1).

Figure 2:
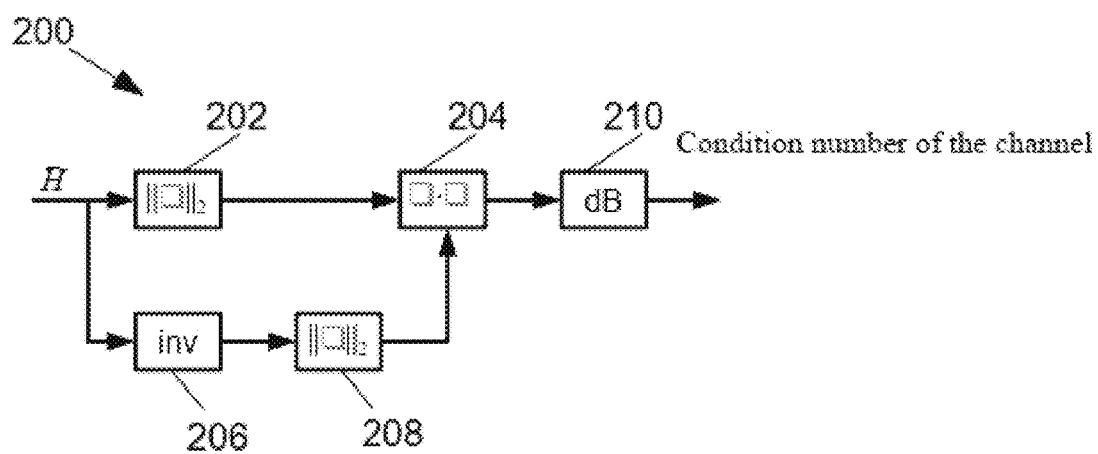
FIG. 2 is a block diagram of a typical structure of the MIMO channel matrix condition number calculation module.

FIG. 2 shows a block diagram of implementation of the calculation of the condition number of the MIMO channel matrix. MIMO channel Condition Number (condition number) is defined as a ratio of the largest singular value to the smallest singular value of the MIMO channel matrix. The common calculation method of the condition number of the MIMO channel matrix is: $k(\bar{H})=\|\bar{H}\|_2 \cdot \|\bar{H}^{-1}\|_2$, where $\|\bar{H}\|_2$ is the 2-norm for the matrix. Generally, the dB value is obtained in the calculation of the condition number of the channel matrix. It is usually considered, $k(\bar{H})$ below 5 dB is very good, and below 10 dB is good.

Condition number of current MIMO channel $k(\bar{H})$ is calculated by the calculation module of the condition number of the channel matrix. The decision threshold is denoted as $k_{tr}$.

As shown in FIG. 2, the module 202 takes the channel matrix as input and takes the 2-norm for the channel matrix; the module 206 takes the channel matrix as input and takes the inverse or pseudo-inverse matrix of the channel matrix for operation; the module 208 takes the 2-norm for the inverse matrix of the channel matrix; the module 204 multiplies the above two 2-norms. The module 210 takes the dB value of the result to obtain the condition number of the channel matrix. It should be understood that although a specific approach of calculating the condition number of the channel is described herein, the implementation of the present disclosure is not limited thereto.

Figure 3:
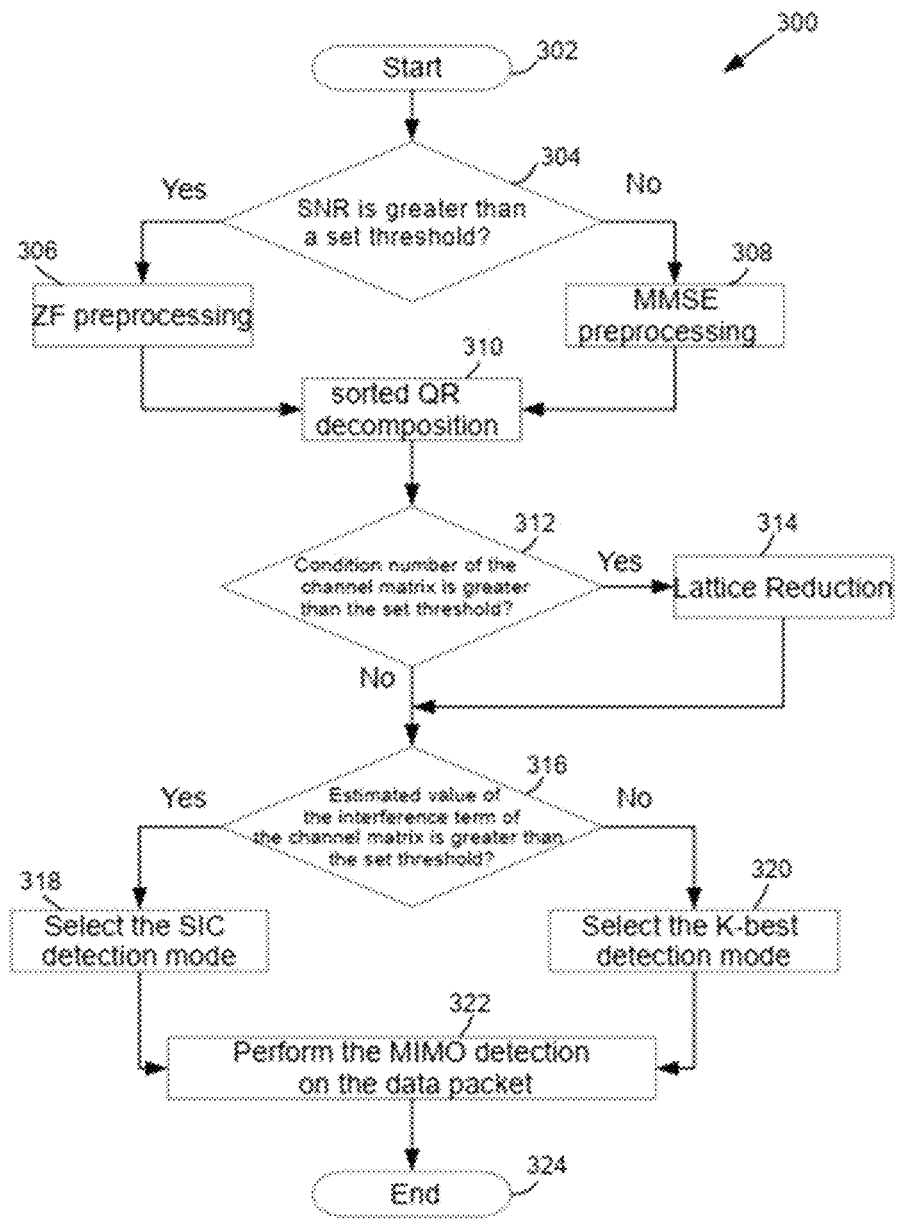
FIG. 3 is a schematic flowchart of an embodiment of an adaptive MIMO detection method according to the present disclosure.

FIG. 3 shows a schematic flowchart according to an embodiment of an adaptive MIMO detection method 300 in the present disclosure. The method begins in step 302. And in step 304, it is determined whether the Signal to Noise Ratio of the data packet is greater than a set threshold for Signal to Noise Ratio. If yes, ZF preprocessing is performed on the channel matrix in step 306. If no, MMSE preprocessing is performed on the channel matrix in step 308.

In step 310, sorted QR decomposition is performed on the channel matrix processed through the above steps to obtain a plurality of decomposition matrices.

In step 312, it is determined whether the condition number of the channel matrix of the data packet is greater than a set threshold for the condition number of the channel. If yes, in step 314, Lattice Reduction is performed on the decomposition matrices obtained in step 310.

If no, proceed to step 316 to determine whether the estimated value of the interference term of the channel matrix of the data packet is greater than a set threshold for the estimated value of the interference term of the channel matrix. If yes, in step 318, the SIC detection mode is selected to perform MIMO detection on the data packet. If no, in step 320, the K-best detection mode is selected to perform MIMO detection on the data packet.

Next, proceed to step 322, and MIMO detection is performed on the data packet according to the processing result of the foregoing steps.

It should be understood that for the decision thresholds used in the technical solution of the present disclosure, such as the above-mentioned set threshold for Signal to Noise Ratio, set threshold for the condition number of the channel, and set threshold for the estimated value of the interference term of the channel matrix, their initial values may be determined by those skilled in the art according to the system environment and application requirements specifically implemented. As examples instead of limitations, these decision thresholds may depend on system parameters on the one hand, and depend on the control target of packet error rate of the system on the other hand. For example, as described below, the initial value of each decision threshold may be set according to parameters such as the number of antennas in the MIMO system or the number of system spatial multiplexing data streams, the M-QAM size, and the target packet error rate. It should be understood that the initial values of the thresholds and the maximum or minimum value mentioned above and below may be determined by conventional means, according to system parameters and design goals, and most importantly, referring to system simulation results under different thresholds.

Figure 4:
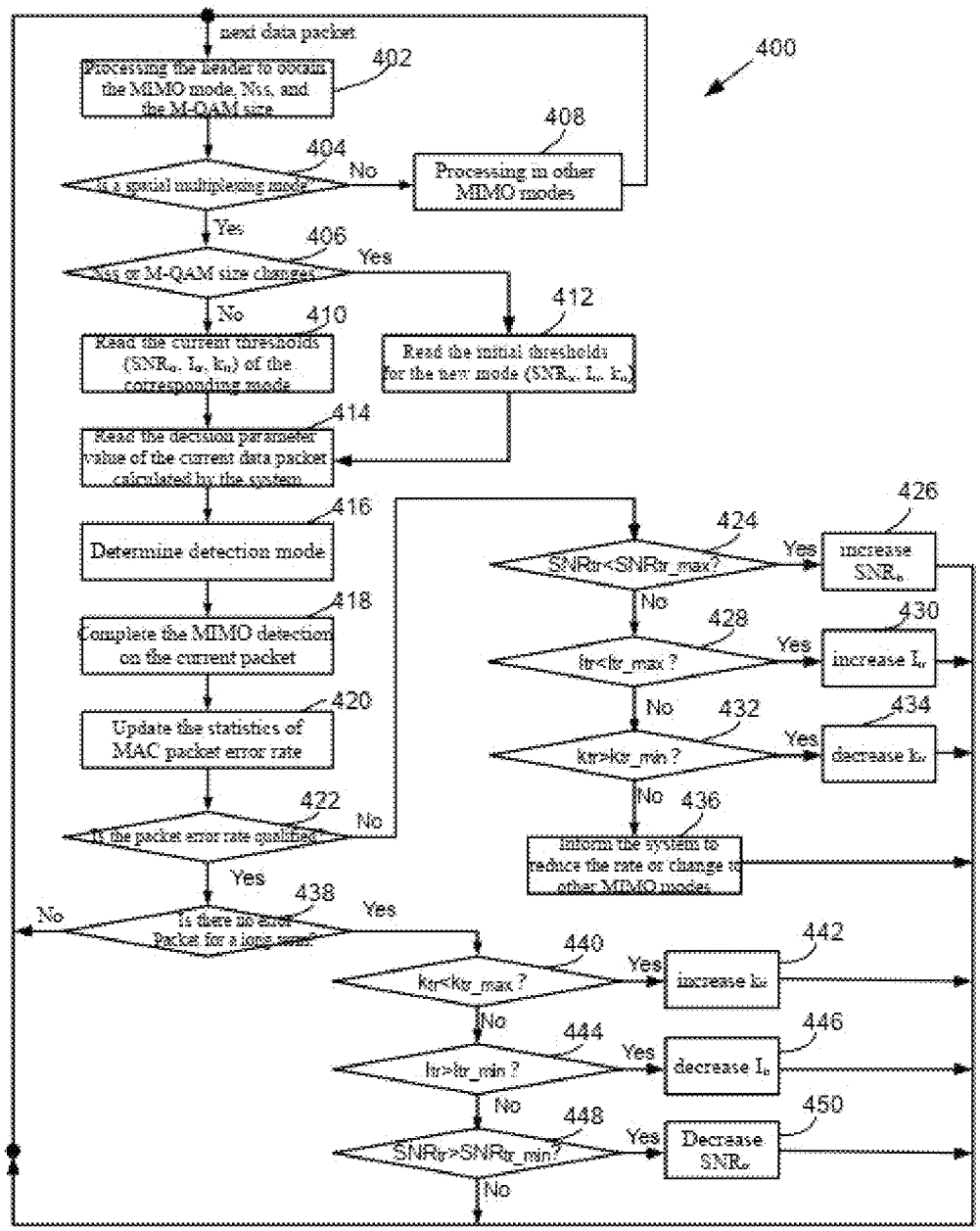
FIG. 4 is a schematic flowchart of another embodiment of an adaptive MIMO detection method according to the present disclosure.

FIG. 4 shows a schematic flowchart according to another embodiment of an adaptive MIMO detection method 400 in the present disclosure. In step 402, processing may be performed on the header of the data packet to obtain parameters such as the MIMO mode, the number of system antennas or Nss (the number of system spatial multiplexing data streams), and the M-QAM size. In the MIMO theory, when the channel matrix is in good condition, the maximum number of spatial multiplexing data streams in the system is: $N_{ss,max} = \min(N_{tx}, N_{rx})$. In normal system use, usually $N_{ss} \leq N_{ss,max}$.

In step 404, it is determined whether the current MIMO mode is a spatial multiplexing mode. If no, proceed to step 408 to perform the processing with other MIMO modes. If yes, proceed to step 406 to further determine whether the Nss or M-QAM size has changed.

If the determination in step 406 is no, proceed to step 410 to read current decision thresholds of the corresponding MIMO mode, for example, $(SNR_{tr}, I_{tr}, K_{tr})$, wherein $SNR_{tr}$ represents the set threshold for Signal to Noise Ratio, $I_{tr}$ represents the set threshold for the estimated value of the interference term of the channel matrix, and $K_{tr}$ represents the set threshold for the condition number of the channel.

If the determination in step 406 is yes, proceed to step 412 to read initial decision thresholds for a new mode, for example, $(SNR_{tr}, I_{tr}, K_{tr})$. It should be understood that before step a) or when a number of MIMO antennas, a number of system spatial multiplexing data streams, or an M-QAM size changes, initial values for the set threshold for Signal to Noise Ratio, the set threshold for the condition number of the channel, and the set threshold for the estimated value of the interference term of the channel matrix may be determined according to the number of MIMO antennas or the number of system spatial multiplexing data streams, and the M-QAM size.

After the decision thresholds for the current data packet is obtained in step 410 or 412, step 414 is executed, in which the decision parameter values of the current data packet calculated by the system may be read, such as the Signal to Noise Ratio of the data packet, the condition number of the channel matrix, and the estimated value of the interference term of the channel matrix of the data packet, etc.

In step 416, the detection mode is determined. In step 418, the MIMO detection of the current packet is completed. It should be understood that step 416 and step 418 may be performed according to the steps shown in step 302 to step 324 in the embodiment shown in FIG. 3, and details are not described herein redundantly.

In step 420, the statistics of MAC packet error rate are updated. In step 422, it is determined whether the packet error rate is qualified. It should be understood that although the statistics of packet error rate shown in step 420 are obtained at the MAC layer, the implementation of the present disclosure is not limited thereto. If the updated statistics of packet error rate are higher than the set threshold for packet error rate, then one or more of the set threshold for Signal to Noise Ratio, the set threshold for the condition number of the channel, and the set threshold for the estimated value of the interference term of the channel matrix are updated for MIMO detection of subsequent data packets.

As an example instead of a limitation, updating one or more of the set threshold for Signal to Noise Ratio, the set threshold for the condition number of the channel, and the set threshold for the estimated value of the interference term of the channel matrix may include one or more of the following: increasing the set threshold for Signal to Noise Ratio, increasing the set threshold for the estimated value of the interference term of the channel matrix, and decreasing the set threshold for the condition number of the channel.

In a particular embodiment, updating one or more of the set threshold for Signal to Noise Ratio, the set threshold for the condition number of the channel, and the set threshold for the estimated value of the interference term of the channel matrix may include:

determining whether the set threshold for Signal to Noise Ratio is less than a set maximum of Signal to Noise Ratio, and if yes, increasing the set threshold for Signal to Noise Ratio;

If the set threshold for Signal to Noise Ratio is greater than or equal to the set maximum value of Signal to Noise Ratio, determining whether the set threshold for the estimated value of the interference term of the channel matrix is less than a set maximum value of the estimated value of the interference term of the channel matrix, and if yes, the set threshold for the estimated value of the interference term of the channel matrix may be increased; and If the set threshold for the estimated value of the interference term of the channel matrix is greater than or equal to the set maximum value of the estimated value of the interference term of the channel matrix, determining whether the set threshold for the condition number of the channel is greater than a set minimum value of the condition number of the channel, and if yes, set threshold for the condition number of the channel may be decreased.

Specifically, as shown in FIG. 4, if it is determined that the packet error rate is qualified in step 422, return to step 402 to process a next data packet. If it is determined in step 422 that the packet error rate is unqualified, proceed to step 424 to determine whether the set threshold $SNR_{tr}$ of Signal to Noise Ratio is smaller than the set maximum value $SNR_{tr\_max}$ of Signal to Noise Ratio.

If the determination of step 424 is yes, proceed to step 426 to increase the set threshold $SNR_{tr}$ of Signal to Noise Ratio.

If the determination of step 424 is no, proceed to step 428 to determine whether the set threshold $I_{tr}$ of the estimated value of the interference term of the channel matrix is smaller than the set maximum value $I_{tr\_max}$ of the estimated value of the interference term of the channel matrix.

If the determination of step 428 is yes, proceed to step 430 to increase the set threshold $I_{tr}$ of the estimated value of the interference term of the channel matrix.

If the determination of step 428 is no, proceed to step 432 to determine whether the set threshold $K_{tr}$ of the condition number of the channel is greater than the set minimum value $K_{tr\_min}$ of the condition number of the channel.

If the determination of step 432 is yes, proceed to step 434 to decrease the set threshold $K_{tr}$ of the condition number of the channel After step 426, step 430, and step 434, the flow returns to step 402, such that the next data packet may be processed.

It should be understood that if the statistics of packet error rate are still higher than the set threshold for packet error rate after the above steps are performed, the system data rate may be reduced. In addition, if the statistics of packet error rate are still higher than the set threshold for packet error rate after the system data rate is reduced, a MIMO operating mode with higher reliability than the spatial multiplexing MIMO operating mode may be adopted.

Specifically, if the determination of step 432 is no, proceed to step 436 to notify the system to reduce the rate or switch to another MIMO mode.

Figure 5:
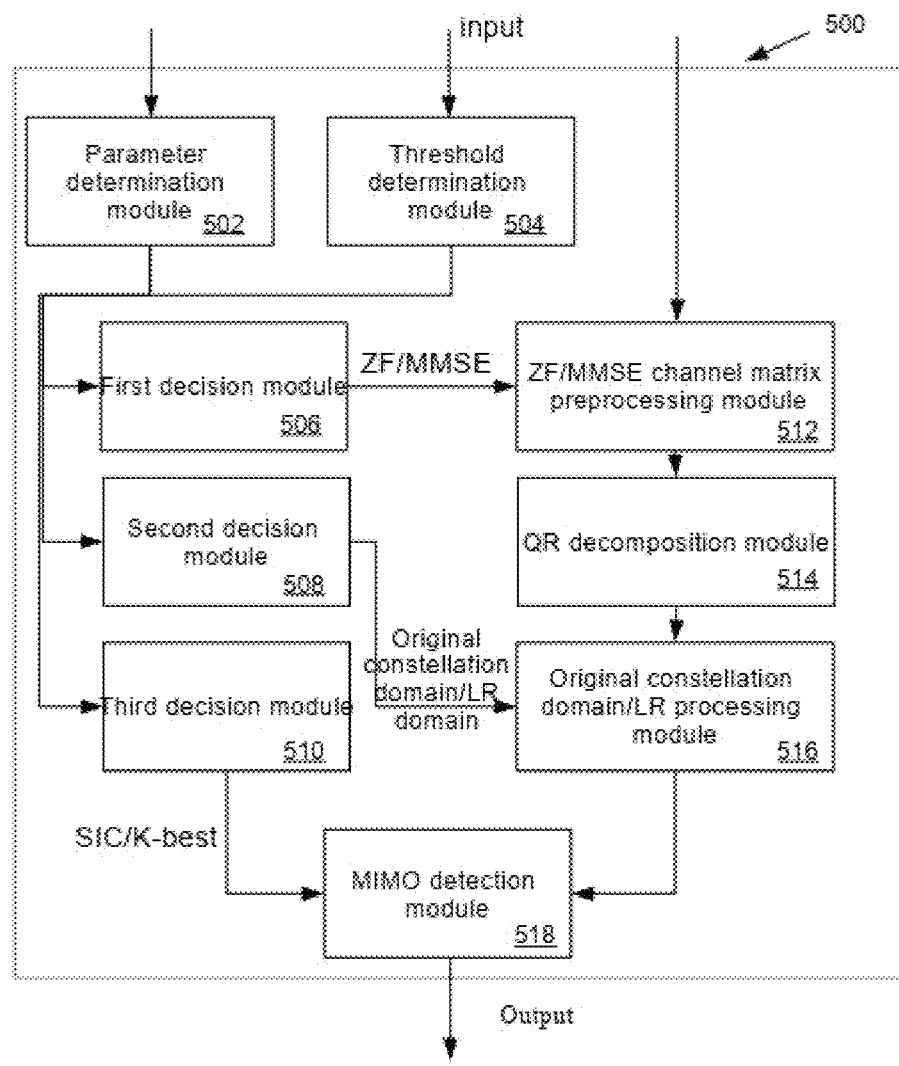
FIG. 5 is a schematic block diagram of a system of an embodiment of an adaptive MIMO detection system according to the present disclosure.

FIG. 5 shows a schematic block diagram of a system according to an embodiment of an adaptive MIMO detection system in the present disclosure. As shown in the figure, the adaptive MIMO detection system 500 may include:

a threshold determination module 504, which is configured to determine a set threshold for Signal to Noise Ratio, a set threshold for the condition number of the channel, and a set threshold for the estimated value of the interference term of the channel matrix;

a parameter determination module 502, which is configured to determine the Signal to Noise Ratio of the data packet, the condition number of the channel matrix of the data packet, and the estimated value of the interference term of the channel matrix of the data packet;

a first decision module 506, which is configured to determine whether the Signal to Noise Ratio of the data packet is greater than the set threshold for Signal to Noise Ratio, and if yes, select to perform ZF preprocessing on the channel matrix, and if not, to select to perform MMSE preprocessing on the channel matrix;

a ZF/MMSE channel matrix preprocessing module 512, which is configured to perform ZF preprocessing or MMSE preprocessing on the channel matrix according to the output of the first decision module 506;

a QR decomposition module 514, which is configured to perform a sorted QR decomposition of the channel matrix processed by the ZF/MMSE channel matrix preprocessing module 512 to obtain a plurality of decomposition matrices;

a second decision module 508, which is configured to determine whether the condition number of the channel matrix of the data packet is greater than the set threshold for the condition number of the channel, and if yes, to select to perform Lattice Reduction on the decomposition matrices obtained by the QR decomposition module;

an original constellation domain/Lattice Reduction domain processing module 516, which is configured to perform Lattice Reduction or not to perform Lattice Reduction on the decomposition matrices obtained by the QR decomposition module 514 according to the output of the second decision module 508;

a third decision module 510, which is configured to determine whether the estimated value of the interference term of the channel matrix of the data packet is greater than the set threshold for the estimated value of the interference term of the channel matrix, and if yes, to select the SIC detection mode for MIMO detection of the data packet, if no, to select the K-best detection mode for MIMO detection of data packets; and a MIMO detection module 518, which is configured to perform MIMO detection on the data packet in the SIC detection mode or the K-best detection mode according to the output 510 of the third decision module.

The MIMO adaptive detection system in the present disclosure is realized by adopting adjustable preprocessing plus an adjustable MIMO triangle detection core. It should be understood that in the context of the present disclosure, the MIMO triangle detection core refers to a core module, which performs MIMO detection decision layer by layer by using the triangularization decomposition of the channel matrix, and after the subsequent layer completes the cancellation of the interference of the decided symbol, makes the decision on the unknown symbol of the current layer. Triangular detection mode refers to a mode which performs MIMO detection based on the channel matrix triangulation. Although it is shown in the present disclosure that two triangular detection cores of SIC detection mode and K-best detection mode, such as MIMO detection module 518, is adopted, the implementation of the present disclosure is not limited thereto, other triangle detection cores of other triangle detection modes equivalent to SIC detection mode and K-best detection mode may be also included in the scope of the present disclosure. That is, although the present disclosure is described in terms of the SIC detection mode and K-best detection mode, the solution of the present disclosure is suitable for adaptive switching among two or more triangle detection modes. For example, the existing or future-developed other triangle detection modes with lower computational complexity and lower detection accuracy may be adopted to equivalently replace the SIC detection modes described herein, and other existing or future-developed triangle detection modes with higher computational complexity and detection accuracy may be adopted to equivalently replace the K-best detection mode described herein without departing from the scope of the present disclosure.

Figure 6:
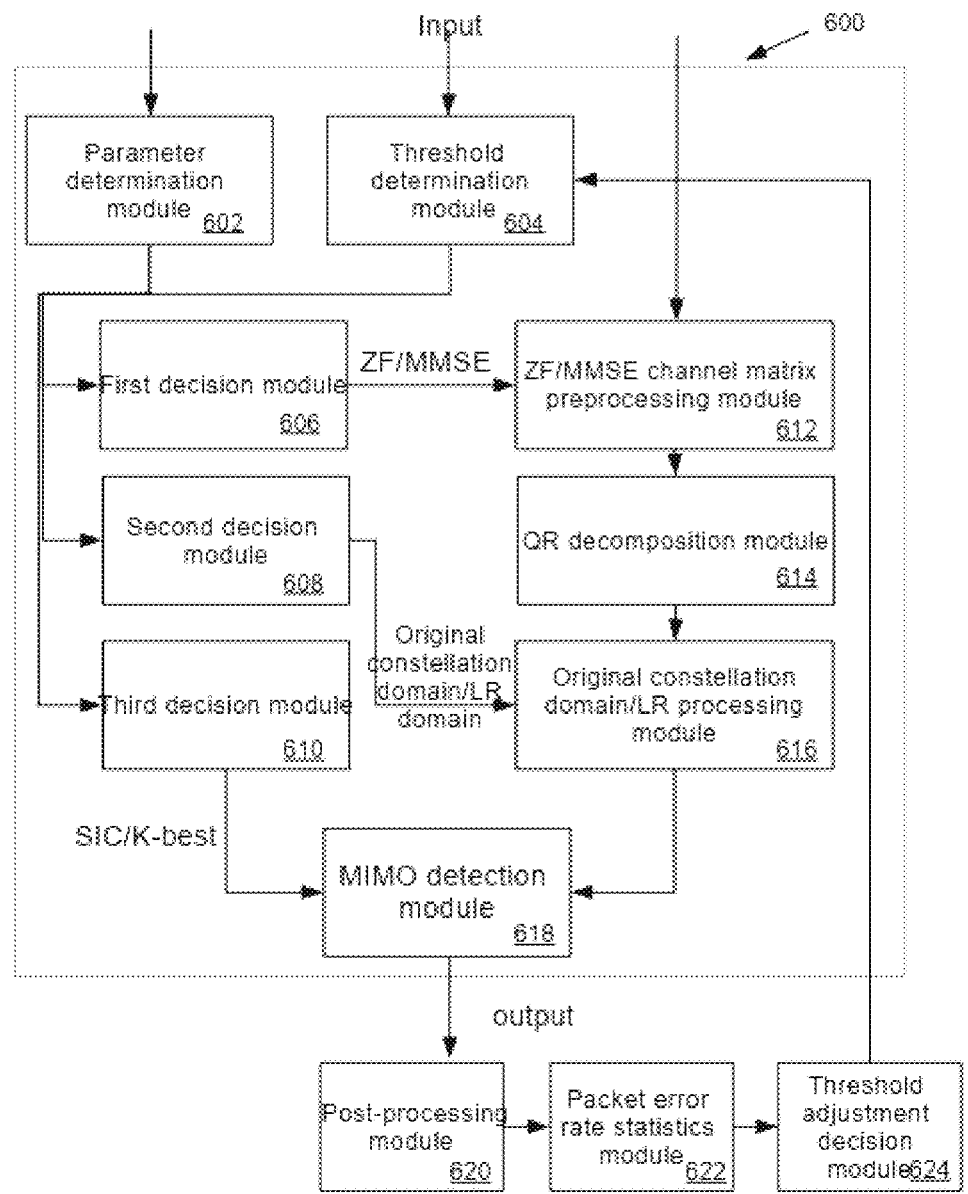
FIG. 6 is a schematic block diagram of a system of another embodiment of an adaptive MIMO detection system according to the present disclosure.

FIG. 6 shows a schematic block diagram of a system according to another embodiment of an adaptive MIMO detection system in the present disclosure. Compared with the adaptive MIMO detection system 500 shown in FIG. 5, in the adaptive MIMO detection system 600 shown in FIG. 6, the module 602 to module 618 are similar to the module 502 to module 518 shown in FIG. 5, so it is not described in detail herein.

A post-processing module 620, a packet error rate statistics module 622, and a threshold adjustment decision module 624 are added in the embodiment shown in FIG. 6. Specifically, the post-processing module 620 is configured to further process the output of the MIMO detection module to complete the decoding of the data packet. The packet error rate statistics module 620 is configured to update the packet error rate statistics after performing MIMO detection on the data packet.

The threshold adjustment decision module 624 is configured to update the one or more of set threshold for Signal to Noise Ratio, the set threshold for the condition number of the channel, and the set threshold for the estimated value of the interference term of the channel matrix for MIMO detection of subsequent data packets, if the updated packet error rate statistics are higher than the set threshold for packet error rate. In a particular embodiment, the threshold adjustment decision module 624 may be configured that updating one or more of the set threshold for Signal to Noise Ratio, the set threshold for the condition number of the channel, and the set threshold for the estimated value of the interference term of the channel matrix includes one or more of the following: increasing the set threshold for Signal to Noise Ratio, increasing the set threshold for the estimated value of the interference term of the channel matrix, and decreasing the set threshold for the condition number of the channel.

In an embodiment, the threshold adjustment decision module 624 may be configured that updating one or more of the set threshold for Signal to Noise Ratio, the set threshold for the condition number of the channel, and the set threshold for the estimated value of the interference term of the channel matrix includes:

determining whether the set threshold for Signal to Noise Ratio is less than a set maximum value of Signal to Noise Ratio, and if yes, increasing the set threshold for Signal to Noise Ratio;

If the set threshold for Signal to Noise Ratio is greater than or equal to the set maximum value of Signal to Noise Ratio, whether the set threshold for the estimated value of the interference term of the channel matrix is less than the set maximum of the estimated value of the interference term of the channel matrix may be determined, and if yes, the set threshold for the estimated value of the interference term of the channel matrix may be increased; and If the set threshold for the estimated value of the interference term of the channel matrix is greater than or equal to the set maximum value of the estimated value of the interference term of the channel matrix, whether the set threshold for the condition number of the channel is greater than the set minimum of the condition number of the channel may be determined, and if yes, the set threshold for the condition number of the channel may be decreased.

The threshold adjustment decision module 624 may also be configured to reduce system data rate if the packet error rate statistics are still higher than the set threshold for packet error rate after one or more of the set threshold for Signal to Noise Ratio, the set threshold for the condition number of the channel, and the set threshold for the estimated value of the interference term of the channel matrix are updated; and adopt a MIMO operating mode with higher reliability than the spatial multiplexing MIMO operating mode, if the packet error rate statistics are still higher than the set threshold for packet error rate after the system data rate is reduced.

The threshold determination module 604 may also be configured to determine initial values for the set threshold for Signal to Noise Ratio, the set threshold for the condition number of the channel, and the set threshold for the estimated value of the interference term of the channel matrix, based on the number of MIMO antennas or the number of system spatial multiplexing data streams, and the M-QAM size. In addition, the threshold determination module 604 may also be configured to update the determination decision thresholds such as the initial values for the set threshold for Signal to Noise Ratio, the set threshold for the condition number of the channel, and the set threshold for the estimated value of the interference term of the channel matrix according to the output of the threshold adjustment decision module 624.

In this way, the adaptive MIMO detection system of the present disclosure may adaptively adjust the decision thresholds according to system conditions such that the multi-level adaptive means match the dynamic system conditions.

Figure 7:
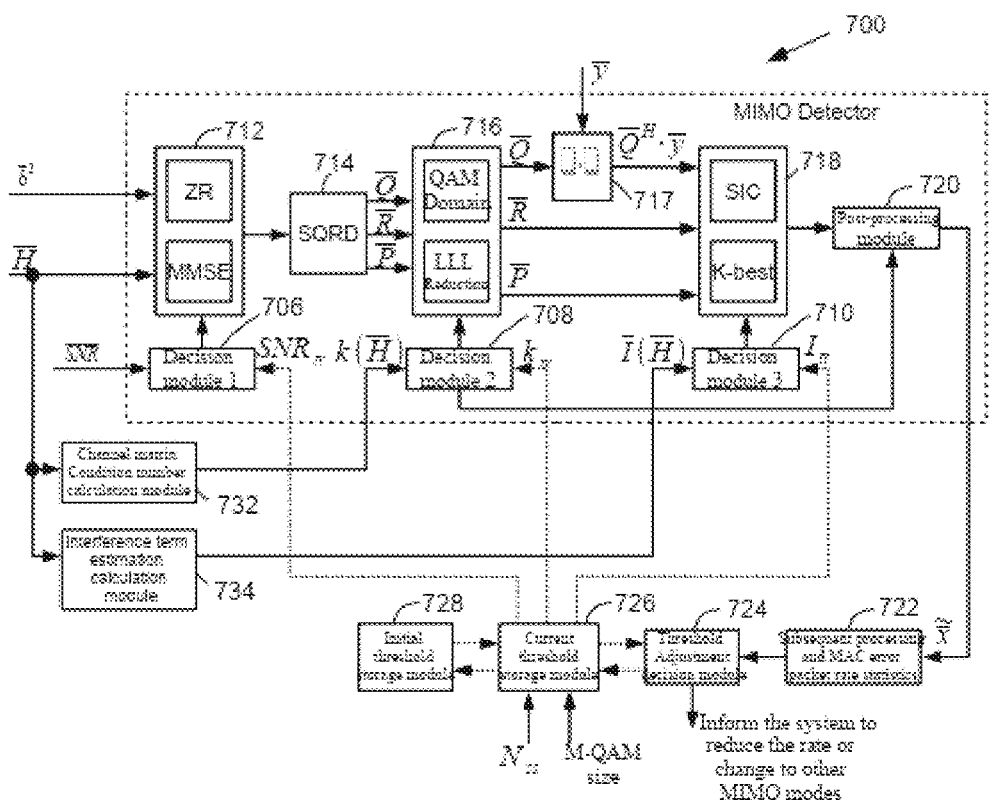
FIG. 7 is a schematic block diagram of a system of yet another embodiment of an adaptive MIMO detection system according to the present disclosure.

FIG. 7 shows a schematic block diagram of a system according to another embodiment of an adaptive MIMO detection system in the present disclosure. In the adaptive MIMO detection system 700, the operations of the first decision module 706, the second decision module 708, the third decision module 710, the ZF/MMSE channel matrix preprocessing module 712, the QR decomposition module 714, the original constellation domain/Lattice Reduction domain processing module 716, the MIMO detection module 718, and the post-processing module 720 are similar to the operations of the corresponding modules shown in FIG. 5 and FIG. 6, and will not be repeated herein.

The operations of the calculation of channel matrix condition number calculation module 732, the interference term estimation calculation module 734, the matrix multiplication module 717, the subsequent processing and MAC packet error rate statistics module 722, the threshold adjustment decision module 724, the n 726, and the initial threshold storage module 728 shown in FIG. 7 will be described below. Herein, corresponding to the LR domain preprocessing, the post-processing module 720 performs operations such as domain inverse transformation. The subsequent processing and MAC packet error rate statistics module 722 may perform operations such as inverse mapping from M-QAM symbol to bit, soft value generation, channel decoding, and de-interleaving.

As shown in FIG. 5 to FIG. 7 and described above, the adaptive MIMO detection system of the present disclosure may be mainly divided into signal processing modules and decision modules, as well as parameter determination modules and threshold determination modules, and the like.

The signal processing modules may include, for example, preprocessing related modules such as the ZF/MMSE channel matrix processing module, the SQRD module and the original constellation domain/Lattice Reduction domain processing module, the post-processing module, and the core detection module (i.e., MIMO triangle core detection module). Among them, except the SQRD module, all are adjustable modules.

The three decision modules control the adjustable signal processing module according to the current signal reception status. At the same time, the current decision parameter values required by the three decision modules and the decision parameter thresholds may be provided by the corresponding calculation module and threshold storage module.

The following is a further description of the preprocessing related modules.

1) ZF/MMSE processing options of channel matrix $\overline{H}$. The ZF/MMSE processing of the channel matrix herein is a preprocessing and expansion method for the channel matrix.

When the impact of system noise is small, the performance of the MMSE method and the ZF method tend to be the same, so the channel matrix $\overline{H}$ of the input detector at the receiving end does not require processing, i.e., $\underline{H}=\overline{H}$.

ZF does not require the noise variance estimation vector of the receiver $\overline{\delta}^2$.

When the system noise has a large impact, if the ZF expansion is adopted, strong noise amplification may appear in the system, which may quickly reduce the detection performance of the system. Therefore, the selection of the MMSE method may achieve a balance between noise amplification and elimination of signal interference between multiple antennas, which makes the system performance optimal.

The MMSE expansion may require the noise variance estimation vector $\overline{\delta}^2$ of receiver.

The MMSE expansion may be $$\underline{H} = \begin{bmatrix} \overline{H} \\ \mathrm{diag}(\overline{\delta^2}) \end{bmatrix},$$

where $\mathrm{diag}(\overline{\delta^2})$ is a diagonal matrix with the noise variance estimation vector $\overline{\delta}^2$ as the diagonal elements.

The first decision module is used to make the decision of channel matrix ZF/MMSE processing. The decision parameter is the estimated vector $\overline{SNR}=[SNR_1 \ldots SNR_{N_{rx}}]$ of the Signal to Noise Ratio on the receiving antennas of the current MIMO channel obtained by the front end of the receiver. The decision threshold is denoted as $SNR_{tr}$.

If min($\overline{SNR}$)<$SNR_{tr}$, the MMSE processing may be adopted, otherwise, ZF processing may be adopted.

2) SQRD module.

The MIMO triangle core detection module needs to perform triangularization decomposition on the MIMO channel matrix, and the commonly used decomposition of which is QR decomposition $\overline{H}=\overline{Q}\cdot\overline{R}$, where $\overline{Q}$ is the unitary matrix, $\overline{R}$ is the upper triangular matrix.

In MIMO triangle detection, there is a very important technique which may be called sorting/ordering. That is, sequential detection may be performed according to the strength of the signal received by the antennas. The stronger signal may be detected first (corresponding to the bottom layer in SIC/K-best) to reduce or minimize detection errors as much as possible, which may lead to subsequent detection deviations.

Preferably, sorted QR decomposition (Sorted QRD, i.e., SQRD) may be adopted in the preprocessing stage in the present disclosure.

Sorted QR decomposition may be performed on $\underline{H}$: $\underline{H}\cdot\underline{P}=\underline{Q}\cdot\underline{R}$, where the generated decomposition matrix $\underline{P}$ is a permutation matrix, $\underline{Q}$ is a unitary matrix, and $\underline{R}$ is an upper triangular matrix.

The original constellation domain/Lattice Reduction domain processing module and post-processing module will be further described below.

From the perspective of information theory, if the correlation between the antennas of the MIMO channel matrix is smaller or weaker, then the spatial multiplexing is sufficient, the spatial diversity gain is high, the channel capacity that may be supported is large, and thus the detection of the spatial multiplexing MIMO mode is easier. On the contrary, if the correlation between the antennas of the MIMO channel matrix is high, then spatial multiplexing is gradually infeasible, the spatial diversity gain is gradually reduced, the supportable channel capacity becomes smaller, and thus MIMO detection becomes more difficult.

When the MIMO channel matrix has strong or high correlation, that is, non-singularity is enhanced, transforming the current MIMO detection to the Lattice Reduction domain (LR domain) is an effective means to reduce the channel correlation and improve the detection performance. The system needs to increase the Lattice Reduction of the MIMO channel matrix and transforming operation of the constellation—LR domain/LR domain—LR domain of the detection vector, and the overhead may be slightly increased.

Lattice Reduction (LR) transformation may orthogonalize MIMO channels, thereby eliminating the performance loss caused by strong channel correlation.

Therefore, when the signal correlation is weak, there is no need to process the SQRD result, and it is sufficient to keep it in the original constellation domain for subsequent detection.

When the channel correlation is strong, in order to adapt to the layer-by-layer detection structure, Lattice Reduction may be performed on the result of the triangularization decomposition of the MIMO channel matrix, and the detection variable is converted to the LR domain.

Commonly used Lattice Reduction algorithms include the LLL (Lenstra, Lenstra and Lovasz) method, the CLLL (complex LLL) method of the complex number system, Seysen's LR, Brun's LR, Element LR, etc. In the present disclosure, the LLL method and the CLLL method may be preferred.

If the Lattice Reduction is performed on the result after SQRD, a new lattice vector may be obtained: $\tilde{H}=\tilde{Q}\cdot\tilde{R}=\underline{H}\cdot\underline{P}\cdot\tilde{T}$.

$\underline{T}=\underline{P}\cdot\tilde{T}$ is denoted as new transformation matrix, then $\tilde{H}=\tilde{Q}\cdot\tilde{R}=\underline{H}\cdot\underline{T}$.

The MIMO detection variable $\bar{x}$ in constellation domain becomes the MIMO detection variable $$\bar{z} = (\underline{T})^{-1}\frac{(\bar{x}+\bar{d})}{2}$$

in the LR domain.

The value of the transformed LR domain detection variable becomes a continuous integer domain, which is greatly changed compared with the original constellation domain. In order to improve the detection efficiency, the upper and lower limits of value of the LR domain detection variables may be calculated to assist the MIMO detection.

The second decision module may be used to determine whether to use the original constellation domain or the Lattice Reduction domain for processing. Its decision parameter may be MIMO channel condition number k. If k($\tilde{H}$)≤$k_{tr}$, the original constellation domain is used for processing, on the contrary, Lattice Reduction is used for processing.

The post-processing module will be further described below.

The second decision module may also be used to control the post-processing module to restore the output signal of the MIMO detector in the LR domain to the original constellation domain. The post-processing module may be an optional module, depending on the preprocessing method (original constellation domain or LR domain) and the MIMO detection method. For example, if it is in the LR domain and the subsequent is a hard decision output, the LR domain detection value output by the MIMO core detection module may need to be inversely transformed to the original constellation domain and quantized to the nearest constellation point; if it is in the LR domain and the subsequent is List MAP LLR soft value output, the LR domain detection value output by the MIMO detector may need to be inversely transformed to the original constellation domain, and the non-constellation points may be discarded.

The following further describes the adjustable MIMO detection core module.

In order to simplify the calculation, the triangular layer-by-layer detection structure in the nonlinear sub-optimal and near-optimal MIMO detection methods may be adopted, that is, the MIMO detection methods, such as SIC/OSIC, or Sphere Detection such as K-best, is adopted, in which it may be necessary to perform the layer-by-layer detection after the MIMO channel matrix being preprocessed and transformed into a triangular structure.

Since sorting has been considered in the preprocessing, the adjustable detection core here may use two modes, SIC and K-best.

Both SIC and K-best transform the channel matrix into a unitary matrix and an upper triangular matrix R based on QRD. Then a special structure of the upper triangular matrix may be used to perform a layer-by-layer search. The difference between the SIC mode and the K best mode lies in the number of points reserved for each layer and the conditions for reservation.

In the SIC mode, only one closest point is reserved or kept in each search layer, and then the interference of this point may be eliminated in subsequent layers. In the K-best mode, K optimal expansions may be kept or reserved in each search layer until the last layer, and subsequent processing may be performed after obtaining K optimal results.

In the spatial multiplexing transmission of MIMO channels, at the receiving end, the received signal of each receiving antenna is the superposition of signals from $N_{tx}$ transmitting antennas, that is, the signals are interference terms with respect to each other. When the interference between signals is very small, that is, when the MIMO channel is close to the interconnection between the transmitting antenna and the receiving antenna (TX/RX) by cables, the performance of the nonlinear sub-optimal SIC detection is close to that of the near-optimal K-best detection, both are close to the performance of ML detection under current channel conditions, and thus a simplified detection method may be used in MIMO detection.

The third decision module may be used to determine whether to adopt SIC detection or K-best detection. The decision parameter is the estimation matrix $\bar{I}$ of interference term of channel matrix. The definition of the parameter may be specified in the case of $N_{tx}=N_{rx}$.

For $N_{rx} \times N_{rx}$ dimensional channel matrix $$\bar{H} = \begin{bmatrix} H_{11} & \cdots & H_{1N_{rx}} \\ H_{21} & \cdots & H_{2N_{rx}} \\ \vdots & \ddots & \vdots \\ H_{N_{rx}1} & \cdots & H_{N_{rx}N_{rx}} \end{bmatrix},$$

which is a $N_{rx} \times N_{rx}$ dimensional interference term estimation matrix.

Each element of $$\bar{I} = \begin{bmatrix} I_{11} & \cdots & I_{1N_{rx}} \\ I_{21} & \cdots & I_{2N_{rx}} \\ \vdots & \ddots & \vdots \\ I_{N_{rx}1} & \cdots & I_{N_{rx}N_{rx}} \end{bmatrix}$$

is:

$$I_{ki} = 10 * \log_{10}\left(\frac{|H_{i[(i+k-1)modN_{rx}]}|^2}{\sum_{j \neq [(i+k-1)modN_{rx}]} |H_{ij}|^2}\right).$$

The decision threshold is denoted as $I_{tr}$. If there is a row vector $\bar{I}_k$ in $\bar{I}$ making $\min(\bar{I}_k) > I_{tr}$, SIC detection may be adopted, otherwise, K-best detection may be adopted.

The channel matrix condition number calculation module 732 calculates the condition number of current MIMO channel matrix $k(\bar{H})$.

The interference term estimation matrix calculation module 734 calculates the interference term estimation matrix of the current MIMO channel matrix.

The initial threshold storage module 728 stores the combination of the number of various system antennas $[N_{tx}, N_{rx}]$ and M-QAM, the initial value combination $[SNR_{tr}, k_{tr}, I_{tr}]$ of the above three thresholds, the upper and lower limits $[SNR_{tr-max}, k_{tr-min}, I_{tr-max}]$ of the highest correspondingly dynamic adjustment complexity, and the upper and lower limits $[SNR_{tr-min}, k_{tr-max}, I_{tr-min}]$ of the lowest complexity.

The larger the number of MIMO antennas, the higher the diversity gain that the MIMO channel may provide, and the simpler detection methods (such as linear demodulation, nonlinear sub-optimal demodulation (SIC/OSIC), etc.) the system may use.

In the case of a single antenna, different M-QAM sizes may have different SNR values when achieving the same error code performance. In MIMO channel conditions, the larger the M-QAM size is, the more it is likely to be affected by the stronger channel correlation so that the performance degrades. At the same time, the larger the M-QAM size is, the higher the detection complexity requirement is.

Therefore, the combination of the initial values of the thresholds and the dynamic adjustment of the upper and lower limits may be determined separately and stored in the initial threshold storage module, based on the performance simulation results of the combination of the number of antennas in each system $[N_{tx}, N_{rx}]$ and M-QAM.

The current threshold storage module 726 may be used to store the combination of the adjusted threshold values in the current system mode.

The threshold adjustment decision module 724 may adjust the current threshold combination in the current threshold storage module according to the packet error rate statistics returned by the MAC, to adjust the behavior of the MIMO detector.

The decision parameters of the multi-level adaptive MIMO detection of the present disclosure will be further described below.

In the adaptive MIMO detection method and system according to the present disclosure, numerous decision parameters may be used. In one embodiment, these decision parameters may be assigned with different priorities.

1) The number of MIMO system antennas $[N_{tx}, N_{rx}]$ and M-QAM size may be assigned with a primary priority. These two parameters determine the initial values $[SNR_{tr}, k_{tr}, I_{tr}]$ of the threshold combination of the decision parameters in the three modules. It should be understood that the number of system antennas and the number of system spatial multiplexing data streams may be interchangeably used as decision parameters in the solution of the present disclosure.

2) The packet error rate statistics in the MAC layer (valid within a time window) may be assigned with a secondary priority. This parameter is used to dynamically adjust the current combination of decision parameter threshold in the system.

If the packet error rate is greater than the system requirement (for example, 10% or less, which is stipulated in the Wi-Fi protocol), and the current signal strength (RSSI) is much better than the system sensitivity (for example, different Wi-Fi modes have different system design sensitivities), it means that the current detection configuration does not meet the system performance requirements, and thus the detection complexity needs to be increased.

The increase in complexity also has a priority order:

First, current $SNR_{tr}$ may be improved and $SNR_{tr} < SNR_{tr-max}$ at the same time, so that MMSE processing may be performed for more cases;

Then, the threshold $I_{tr}$ of the estimated value of the interference term of the channel matrix may be increased and at the same time $I_{tr} < I_{tr-max}$, the K-best detection may be adopted in more cases;

Finally, the threshold $k_{tr}$ of the condition number of MIMO channel may be lowered and at the same time $k_{tr} > k_{tr-min}$, such that more MIMO detection may be performed in the Lattice Reduction domain.

If the bit error rate requirement is still not met when the system detection complexity is the highest (MMSE SQRD LRA K-best), the MAC layer informs the upper layer of the system to reduce the system data rate (for example, a lower MCS mode may be adopted in Wi-Fi). If the bit error rate still does not meet the requirements when in the mode with the lowest system data rate and the detection complexity of the system is the highest, it indicates that the spatial multiplexing MIMO mode is not available, and thus the MAC layer informs the upper layer to request to switch to MIMO mode with higher reliability (for example, STBC, etc.); at the same time, the condition number of the MIMO channel will be large at this time, the freedom degree of the channel will be reduced, and thus spatial multiplexing may no longer be supported.

On the contrary, when the system packet error rate statistics module has detected a specified number of packets or within a specified period of time, no packet error has occurred or the packet error rate has always been qualified, it indicates that the system communication is in good condition. Therefore, the detection configuration of current system may be simplified accordingly to increase the processing speed and reduce the system resources consumed by the detection.

The simplification of the complexity may follow the following priority order:

first, the threshold $k_{tr}$ of condition number of MIMO channel may be increased and at the same time $k_{tr} < k_{tr-max}$, such that more MIMO detection may be performed in the original constellation domain;

then, current threshold $I_{tr}$ of the estimated value of the interference term of the channel matrix may be reduced and at the same time $I_{tr} > I_{tr-min}$, such that the SIC testing may be adopted in more cases;

finally, the current $SNR_{tr}$ may be reduced and at the same time $SNR_{tr} > SNR_{tr-min}$, so that the ZF preprocessing may be performed in more cases.

When the detection configuration of the system is the simplest and the system packet error rate statistics still meet the requirements, the current configuration may be maintained until the system packet error rate does not meet the requirements, and the reverse adjustment may be carried out.

In a particular embodiment, referring to FIG. 4, when the packet error rate is determined to meet the requirement in step 422, whether the condition in which there is no packet with error for a long term, namely the long-term error-free packet condition, may be determined in step 438. The long-term error-free packet condition, for example, may be defined as a situation where the packet error rate is always lower than the set threshold for packet error rate within a specified time period or when a specified number of data packets have been detected. It should be understood that the specific time period or the specific number may be determined by conventional means according to the system environment and application requirements.

In step 440, whether the set threshold $k_{tr}$ of the condition number of the channel is less than the maximum value $k_{tr-max}$ of the condition number of the channel may be determined. If yes, the set threshold $k_{tr}$ of the condition number of the channel may be increased in step 422;

If the determination of step 440 is no, then whether the set threshold $I_{tr}$ of the estimated value of the interference term of the channel matrix is greater than the set minimum value $I_{tr-min}$ of the estimated value of the interference term of the channel matrix may be determined in step 444, and if yes, the set threshold $I_{tr}$ of the estimated value of the interference term of the channel matrix may be reduced in step 446; and If the determination in step 444 is no, then whether the set threshold for Signal to Noise Ratio is greater than the set minimum of Signal to Noise Ratio may be determined in step 448, and if yes, the set threshold for the condition number of the channel may be reduced in step 450, and if no, the threshold may be not adjusted and return to step 402.

3) the parameters used for the current packet MIMO detection and determination may be assigned with a tertiary priority: Signal to Noise Ratio estimation vector $\overline{SNR}$, condition number $k(\overline{H})$ of MIMO channel, and the matrix $\overline{I}$ of the estimated value of the interference term of the channel matrix. When the system parameters and MAC layer error rate statistics are known, the current thresholds corresponding to the three ones may be read, and the values obtained from current packet may be compared with the corresponding thresholds to obtain the decision result and perform subsequent MIMO detection.

In addition, the adaptive MIMO detection method and system of the present disclosure are suitable for MIMO-OFDM system.

Specifically, for the MIMO-OFDM system, the MIMO detection of each subcarrier may be independent. For the MIMO channel of each subcarrier in the MIMO-OFDM system, the condition number of the channel and the matrix of estimated value of interference term of channel thereof may be also calculated independently.

According to the M-QAM symbol loading situation, the Signal to Noise Ratio estimation vector $\overline{SNR}$ may be estimated separately to obtain $\overline{SNR}_i$ based on different subcarriers, it may also estimate all sub-carriers as a whole based on the antennas.

The combination $[SNR_{tr}, k_{tr}, I_{tr}]$ of determination threshold for MIMO detection system for current packet is the same for all sub-carriers.

When the i-th subcarrier is detected, the decision parameter $\overline{SNR}_i k(\overline{H})_i I_i$ obtained on the current subcarrier may be compared with the combination $[SNR_{tr}, k_{tr}, I_{tr}]$ of the decision thresholds for the current package to determine the detector configuration suitable for the current subcarrier.

Therefore, the MIMO detector configuration of each subcarrier may be also independent of each other. Accordingly, those skilled in the art should understand that the MIMO detection for data packets described above may be also applicable to the MIMO detection for each subcarrier in the MIMO-OFDM system.

The above embodiments describe specific operation procedures by way of example, but it should be understood that the protection scope of the present disclosure is not limited thereto.

Although various embodiments of various aspects of the present disclosure have been described for the purpose of the present disclosure, it should not be understood that the teachings of the present disclosure are limited to these embodiments. The features disclosed in a particular embodiment are not limited thereto embodiment, but may be combined with features disclosed in different embodiments. In addition, it should be understood that the method steps described above may be executed sequentially, executed in parallel, combined into fewer steps, split into more steps, combined and/or omitted in a different manner. The above-mentioned modules and/or units may also be combined into larger modules, split into more modules, combined in a different manner, and/or omitted. Those skilled in the art should understand that there are more possible alternative embodiments and modifications, and various changes and modifications may be made to the above-mentioned components and structures without departing from the scope defined by the claims of the present disclosure.

The invention claimed is:

1. An adaptive MIMO detection method, comprising the steps of:

a) determining whether a Signal to Noise Ratio of a data packet is greater than a set threshold for Signal to Noise Ratio, and if yes, performing ZF preprocessing on a channel matrix, and if not, performing MMSE preprocessing on the channel matrix;

b) performing a sorted QR decomposition of the channel matrix processed in step a) to obtain a plurality of decomposition matrices;

c) determining whether a condition number of the channel matrix of the data packet is greater than a set threshold for the condition number of a channel, and if yes, performing Lattice Reduction on the decomposition matrices obtained in step b);

d) determining whether an estimated value of an interference term of the channel matrix of the data packet is greater than a set threshold for the estimated value of the interference term of the channel matrix, and if yes, selecting a SIC detection mode for MIMO detection on the data packet, and if not, selecting a K-best detection mode for MIMO detection on the data packet; and e) according to processing results from steps a) to d), performing MIMO detection on the data packet.

2. The method according to claim 1, wherein before step a) or when a number of MIMO antennas, a number of system spatial multiplexing data streams, or an M-QAM size changes, based on the number of MIMO antennas, the number of system spatial multiplexing data streams and the M-QAM size, determining initial values for the set threshold for Signal to Noise Ratio, the set threshold for the condition number of the channel, and the set threshold for the estimated value of the interference term of the channel matrix.

3. The method according to claim 1, wherein after step e), further comprising the steps of:

f) updating packet error rate statistics; and g) if the updated packet error rate statistics are higher than a set threshold for packet error rate, updating one or more of the set threshold for Signal to Noise Ratio, the set threshold for the condition number of the channel, and the set threshold for the estimated value of the interference term of the channel matrix for MIMO detection on subsequent data packets.

4. The method according to claim 3, wherein in step g), updating one or more of the set threshold for Signal to Noise Ratio, the set threshold for the condition number of the channel, and the set threshold for the estimated value of the interference term of the channel matrix includes increasing the set threshold for Signal to Noise Ratio.

5. The method according to claim 3, wherein in step g), updating one or more of the set threshold for Signal to Noise Ratio, the set threshold for the condition number of the channel, and the set threshold for the estimated value of the interference term of the channel matrix includes increasing the set threshold for the estimated value of the interference term of the channel matrix.

6. The method according to claim 3, wherein in step g), updating one or more of the set threshold for Signal to Noise Ratio, the set threshold for the condition number of the channel, and the set threshold for the estimated value of the interference term of the channel matrix includes lowering the set threshold for the condition number of the channel.

7. The method according to claim 3, wherein in step g), updating one or more of the set threshold for Signal to Noise Ratio, the set threshold for the condition number of the channel, and the set threshold for the estimated value of the interference term of the channel matrix includes:

determining whether the set threshold for Signal to Noise Ratio is less than a set maximum value of Signal to Noise Ratio, and if yes, increasing the set threshold for Signal to Noise Ratio;

if the set threshold for Signal to Noise Ratio is greater than or equal to the set maximum value of Signal to Noise Ratio, determining whether the set threshold for the estimated value of the interference term of the channel matrix is less than a set maximum value of estimated value of the interference term of the channel matrix, and if yes, increasing the set threshold for the estimated value of the interference term of the channel matrix; and if the set threshold for the estimated value of the interference term of the channel matrix is greater than or equal to the set maximum value of the estimated value of the interference term of the channel matrix, determining whether the set threshold for the condition number of the channel is greater than a set minimum value of the condition number of the channel, and if yes, reducing the set threshold for the condition number of the channel.

8. The method according to claim 3, wherein if after performing step g), the packet error rate statistics are still higher than the set threshold for packet error rate, then reducing a system data rate; and if after reducing the system data rate, the packet error rate statistics are still higher than the set threshold for packet error rate, adopting a MIMO operating mode with higher reliability than a spatial multiplexing MIMO operating mode.

9. The method according to claim 1, wherein after step e), further comprising following steps:

f) updating the packet error rate statistics; and h) if the updated packet error rate statistics are lower than a set threshold for packet error rate within a specified time period or when a specified number of data packets have been detected, one or more of the following actions are performed for MIMO detection on subsequent data packets, the actions including: increasing the set threshold for the condition number of the channel, reducing the set threshold for the estimated value of the interference term of the channel matrix, and reducing the set threshold for Signal to Noise Ratio.

10. The method according to claim 9, wherein in step h), the actions comprises:

determining whether the set threshold for the condition number of the channel is less than a set maximum value of the condition number of the channel, and if yes, increasing the set threshold for the condition number of the channel;

if the set threshold for the condition number of the channel is greater than or equal to the set maximum value of the threshold for the condition number of the channel, determining whether the set threshold for the estimated value of the interference term of the channel matrix is greater than a set minimum value of the estimated value of the interference term of the channel matrix, and if yes, then reducing the set threshold for the estimated value of the interference term of the channel matrix;

if the set threshold for the estimated value of the interference term of the channel matrix is less than or equal to the set minimum value of the estimated value of the interference term of the channel matrix, determining whether the set threshold for Signal to Noise Ratio is greater than a set minimum value of Signal to Noise Ratio, and if yes, reducing the set threshold for the condition number of the channel; and if the set threshold for Signal to Noise Ratio is less than or equal to the set minimum value of Signal to Noise Ratio, no thresholds are adjusted.

11. An adaptive MIMO detection system, comprising:
a threshold determination module configured to determine a set threshold for Signal to Noise Ratio, a set threshold for a condition number of the channel, and a set threshold for an estimated value of an interference term of a channel matrix;
a parameter determination module configured to determine a Signal to Noise Ratio of a data packet, a condition number of the channel matrix of the data packet, and the estimated value of the interference term of the channel matrix of the data packet;
a first decision module configured to determine whether Signal to Noise Ratio of the data packet is greater than the set threshold for Signal to Noise Ratio, and if yes, selecting to perform ZF preprocessing on the channel matrix, and if not, selecting to perform MMSE preprocessing on the channel matrix;
a ZF/MMSE channel matrix preprocessing module configured to perform ZF preprocessing or MMSE preprocessing on the channel matrix based on an output of the first decision module;
a QR decomposition module configured to perform a sorted QR decomposition on the channel matrix processed by the ZF/MMSE channel matrix preprocessing module to obtain a plurality of decomposition matrices;
a second decision module configured to determine whether the condition number of the channel matrix of the data packet is greater than the set threshold for the condition number of the channel, and if yes, selecting to perform Lattice Reduction on the decomposition matrices obtained by the QR decomposition module;
an original constellation domain/Lattice Reduction domain processing module configured to perform Lattice Reduction or not to perform Lattice Reduction on the decomposition matrices obtained by the QR decomposition module based on an output of the second decision module;
a third decision module configured to determine whether the estimated value of the interference term of the channel matrix of the data packet is greater than the set threshold for the estimated value of the interference term of the channel matrix, and if yes, selecting a SIC detection mode for MIMO detection of the data packet, and if not, selecting a K-best detection mode for MIMO detection of the data packet; and
a MIMO detection module configured to perform MIMO detection on the data packet in the SIC detection mode or the K-best detection mode based on an output of the third decision module.

12. The system according to claim 11, wherein the threshold determination module is further configured to determine initial values for the set threshold for Signal to Noise Ratio, the set threshold for the condition number of the channel, and the set threshold for the estimated value of the interference term of the channel matrix based on a number of MIMO antennas, a number of system spatial multiplexing data streams, and an M-QAM size.

13. The system according to claim 11, further comprising:
a packet error rate statistics module configured to update the packet error rate statistics after performing MIMO detection on the data packet; and
a threshold adjustment decision module configured to update one or more of the set threshold for Signal to Noise Ratio, the set threshold for the condition number of the channel, and the set threshold for the estimated value of the interference term of the channel matrix for the MIMO detection of subsequent data packets, if the updated packet error rate statistics are higher that a set threshold for packet error rate.

14. The system according to claim 13, wherein the threshold adjustment decision module is configured such that updating one or more of the set threshold for Signal to Noise Ratio, the set threshold for the condition number of the channel, and the set threshold for the estimated value of the interference term of the channel matrix includes increasing the set threshold for Signal to Noise Ratio.

15. The system according to claim 13, wherein the threshold adjustment decision module is configured such that updating one or more of the set threshold for Signal to Noise Ratio, the set threshold for the condition number of the channel, and the set threshold for the estimated value of the interference term of the channel matrix includes increasing the set threshold for the estimated value of the interference term of the channel matrix.

16. The system according to claim 13, wherein the threshold adjustment decision module is configured such that updating one or more of the set threshold for Signal to Noise Ratio, the set threshold for the condition number of the channel, and the set threshold for the estimated value of the interference term of the channel matrix includes decreasing the set threshold for the condition number of the channel.

17. The system according to claim 13, wherein the threshold adjustment decision module is configured such that updating one or more of the set threshold for Signal to Noise Ratio, the set threshold for the condition number of the channel, and the set threshold for the estimated value of the interference term of the channel matrix includes:
determining whether the set threshold for Signal to Noise Ratio is less than a set maximum value of Signal to Noise Ratio, and if yes, increasing the set threshold for Signal to Noise Ratio;
if the set threshold for Signal to Noise Ratio is greater than or equal to the set maximum value of Signal to Noise Ratio, determining whether the set threshold for the estimated value of the interference term of the channel matrix is less than a set maximum value of the estimated value of the interference term of the channel matrix, and if yes, increasing the set threshold for the estimated value of the interference term of the channel matrix; and
if the set threshold for the estimated value of the interference term of the channel matrix is greater than or equal to the set maximum value of the estimated value of the interference term of the channel matrix, determining whether the set threshold for the condition number of the channel is greater than a set minimum value of the condition number of the channel, and if yes, reducing the set threshold for the condition number of the channel.

18. The system according to claim 13, wherein the threshold adjustment decision module is configured to reduce the system data rate, if the packet error rate statistics are still higher than the set threshold for packet error rate after one or more of the set threshold for Signal to Noise Ratio, the set threshold for the condition number of the channel, and the set threshold for the estimated value of the interference term of the channel matrix are updated; and
if the packet error rate statistics are still higher than the set threshold for packet error rate after reducing the system data rate, adopting a MIMO operating mode with higher reliability than a spatial multiplexing MIMO operating mode.

19. The system according to claim 13, wherein the threshold adjustment decision module is configured such that if the updated packet error rate statistics are lower than the set threshold for packet error rate within a specified time period or when a specified number of data packets have been detected, one or more following actions are performed for the MIMO detection of subsequent data packet, the actions include: increasing the set threshold for the condition number of the channel, reducing the set threshold for the estimated value of the interference term of the channel matrix, and reducing the set threshold for Signal to Noise Ratio.

20. The method according to claim 19, wherein the threshold adjustment decision module is configured such that the actions comprises:

determining whether the set threshold for the condition number of the channel is less than a set maximum value of the condition number of the channel, and if yes, increasing the set threshold for the condition number of the channel;

if the set threshold for the condition number of the channel is greater than or equal to the set maximum value of the threshold for the condition number of the channel, determining whether the set threshold for the estimated value of the interference term of the channel matrix is greater than a set minimum value of the estimated value of the interference term of the channel matrix, and if yes, then reducing the set threshold for the estimated value of the interference term of the channel matrix;

if the set threshold for the estimated value of the interference term of the channel matrix is less than or equal to the set minimum value of the estimated value of the interference term of the channel matrix, determining whether the set threshold for Signal to Noise Ratio is greater than a set minimum value of Signal to Noise Ratio, and if yes, reducing the set threshold for the condition number of the channel; and if the set threshold for Signal to Noise Ratio is less than or equal to the set minimum value of Signal to Noise Ratio, no thresholds are adjusted.

* * * * *